US012705879B2

(12) United States Patent
Morton, Jr. et al.

(10) Patent No.: US 12,705,879 B2
(45) Date of Patent: Aug. 11, 2026

(54) SYSTEMS AND METHODS FOR UNDERWATER FLOW ANALYSIS

(71) Applicant: CoVar, LLC, Wilmington, DE (US)

(72) Inventors: Kenneth D. Morton, Jr., Wilmington, DE (US); Sudeep Mandal, Wilmington, DE (US)

(73) Assignee: CoVar, LLC, McLean, VA (US)

(*) Notice: Subject to any disclaimer, the term of this patent is extended or adjusted under 35 U.S.C. 154(b) by 650 days.

(21) Appl. No.: 18/125,533

(22) Filed: Mar. 23, 2023

(65) Prior Publication Data

US 2024/0318547 A1 Sep. 26, 2024

(51) Int. Cl.

| | |
|---|---|
| ***G06V 20/05*** | (2022.01) |
| ***G06T 7/00*** | (2017.01) |
| ***G06T 7/20*** | (2017.01) |
| ***G06T 7/40*** | (2017.01) |
| ***G06T 7/70*** | (2017.01) |

(52) U.S. Cl.

CPC .............. *G06V 20/05* (2022.01); *G06T 7/001* (2013.01); *G06T 7/20* (2013.01); *G06T 7/40* (2013.01); *G06T 7/70* (2017.01)

(58) Field of Classification Search

CPC .. G06V 20/05; G06T 7/40; G06T 7/20; G06T 7/001

See application file for complete search history.

(56) References Cited

U.S. PATENT DOCUMENTS

| | | | | |
|---|---|---|---|---|
| 8,905,155 | B1 * | 12/2014 | Berger, III ................ | E21B 7/12 166/250.01 |
| 2017/0094310 | A1 * | 3/2017 | Dong ..................... | H04N 19/20 |
| 2022/0003105 | A1 * | 1/2022 | Verissimo ............... | G01M 3/08 |
| 2022/0270361 | A1 * | 8/2022 | Henley ................. | E21B 47/002 |

OTHER PUBLICATIONS

Xie, K., Li, T., Liang, Y., & Zhang, Y. (Oct. 2022). A Real-time Identification Method Based on Static-dynamic Optical Flow Features for Deep-sea Hydrothermal Plumes. In Oceans 2022, Hampton Roads (pp. 1-5). IEEE. (Year: 2022).*

* cited by examiner

*Primary Examiner* — Ian L Lemieux

(74) *Attorney, Agent, or Firm* — HUNTON ANDREWS KURTH LLP

(57) ABSTRACT

This invention relates generally to analyzing fluid flow and calculating significant deviations in fluid flow. There is a system and a method. The system includes a user device, a video acquisition processor, a server, and a database. Generally, the method includes recording underwater fluid flow, analyzing the fluid flow using fluid flow and object detection algorithms, checking for deviations in recent fluid flow, and alerting a user.

11 Claims, 4 Drawing Sheets

SYSTEMS AND METHODS FOR UNDERWATER FLOW ANALYSIS

FIELD OF DISCLOSURE

The present disclosure relates generally to observing and analyzing underwater fluid flow.

BACKGROUND

Deep underwater drilling methods often use fluids to remove debris from bore holes. While the bore hole is being dug, the fluids disperse the debris from the bore hole. It is often inconvenient or infeasible to recover the fluids once they have been used. Therefore, environmentally safe fluids are used and the fluid are dispersed into the ocean. To identify any irregular fluid flows coming from the bore hole, an unmanned underwater vehicle monitors the fluid flow. Although this conventional method is somewhat useful, there are deficiencies. The video capture by the unmanned vehicle must be reviewed by a human supervisor. The supervisor is prone to human error. Even if the supervisor makes a correct observation regarding the fluid flow, he may waste significant time before action can be taken. Ultimately, the reliance on a human supervisor leads to inconsistent observations and potentially catastrophic error.

These and other deficiencies exist. Therefore, there is a demand for a faster, more accurate system and method for analyzing underwater fluid flow.

SUMMARY OF THE DISCLOSURE

Embodiments of the present disclosure provide A system for measuring underwater fluid flow with full motion video, the system comprising a user device, a video acquisition processor, a data storage unit configured to store at least one or more sets of historical normal flow data, and a server comprising at least a texture prediction algorithm, a fluid motion estimation algorithm, an object detection algorithm, and a fusion algorithm, the fusion algorithm configured to analyze the findings of the texture prediction algorithm, the fluid motion estimation algorithm, and the object detection algorithm. The server is configured to receive, over a network, one or more images or videos from the video acquisition processor, the images or videos comprising visual information associated with one or more flowing fluids. Then, the server can identify, by the texture prediction algorithm, one or more current image textures associated with the flowing fluids. Then, the server can compare, by the fluid motion estimation algorithm, the one or more current images of the flowing fluids to one or more earlier images of the flowing fluids. Then, the server can determine, upon comparing the current images to the earlier images, where fluid movement is occurring. Then, the server can identify, by the object detection algorithm, one or more objects near the flowing fluids. Then, the server can analyze, by the fusion algorithm, the current image textures, the fluid movement, and the one or more objects near the flowing fluids. Then the server can calculate, by the fusion algorithm upon analyzing the current image textures, the fluid movement, and the one or more objects near the flowing fluids, an estimated outward fluid flow. Then, the server can compare, by the fusion algorithm, the estimated outward fluid flow with the one or more sets of historical normal flow data. Then, the server can determine, by the fusion algorithm, whether the estimated outward fluid flow expresses a deviation from the historical normal flow data. Then, the server can capture, upon determining that the estimated outward fluid flow expresses a deviation from the historical normal flow data, a visual image or video of the current fluid flow. Then, the server can generate an auditory or visual alert. Then, the server can transmit the visual image or video of the current fluid flow and the auditory or visual alert to the user device.

Embodiments of the present disclosure provide a method for measuring underwater fluid flow with full motion video. The method comprises the steps of: receiving, over a network, one or more images or videos from a video acquisition processor, images or videos comprising visual information associated with one or more flowing fluids; identifying, by a texture prediction algorithm, one or more current image textures associated with the flowing fluids; comparing, by a fluid motion estimation algorithm, the one or more current images of the flowing fluids to one or more earlier images of the flowing fluids; determining, upon comparing the current images to the earlier images, where fluid movement is occurring; identifying, by an object detection algorithm, one or more objects near the flowing fluids; analyzing, by a fusion algorithm, the current image textures, the fluid movement, and the one or more objects near the flowing fluids; calculating, by the fusion algorithm upon analyzing the current image textures, the fluid movement, and the one or more objects near the flowing fluids, an estimated outward fluid flow; compare, by the fusion algorithm, the estimated outward fluid flow with the one or more sets of historical normal flow data; determining, by the fusion algorithm, whether the estimated outward fluid flow expresses a deviation from the historical normal flow data; capturing, upon determining that the estimated outward fluid flow expresses a deviation from the historical normal flow data, a visual image or video of the current fluid flow; generating an auditory or visual alert; and transmitting the visual image or video of the current fluid flow and the auditory or visual alert to a user device.

Embodiments of the present disclosure provide a computer readable non-transitory medium comprising computer executable instructions that, when executed on a processor, perform procedures comprising the steps of: receiving, over a network, one or more images or videos from a video acquisition processor, images or videos comprising visual information associated with one or more flowing fluids; identifying, by a texture prediction algorithm, one or more current image textures associated with the flowing fluids; comparing, by a fluid motion estimation algorithm, the one or more current images of the flowing fluids to one or more earlier images of the flowing fluids; determining, upon comparing the current images to the earlier images, where fluid movement is occurring; identifying, by an object detection algorithm, one or more objects near the flowing fluids; analyzing, by a fusion algorithm, the current image textures, the fluid movement, and the one or more objects near the flowing fluids; calculating, by the fusion algorithm upon analyzing the current image textures, the fluid movement, and the one or more objects near the flowing fluids, an estimated outward fluid flow; compare, by the fusion algorithm, the estimated outward fluid flow with the one or more sets of historical normal flow data; determining, by the fusion algorithm, whether the estimated outward fluid flow expresses any deviations from the historical normal flow data; capturing, upon determining that the estimated outward fluid flow expresses a deviation from the historical normal flow data, a visual image or video of the current fluid flow; generating an auditory or visual alert; and transmitting the visual image or video of the current fluid flow and the auditory or visual alert to a user device.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
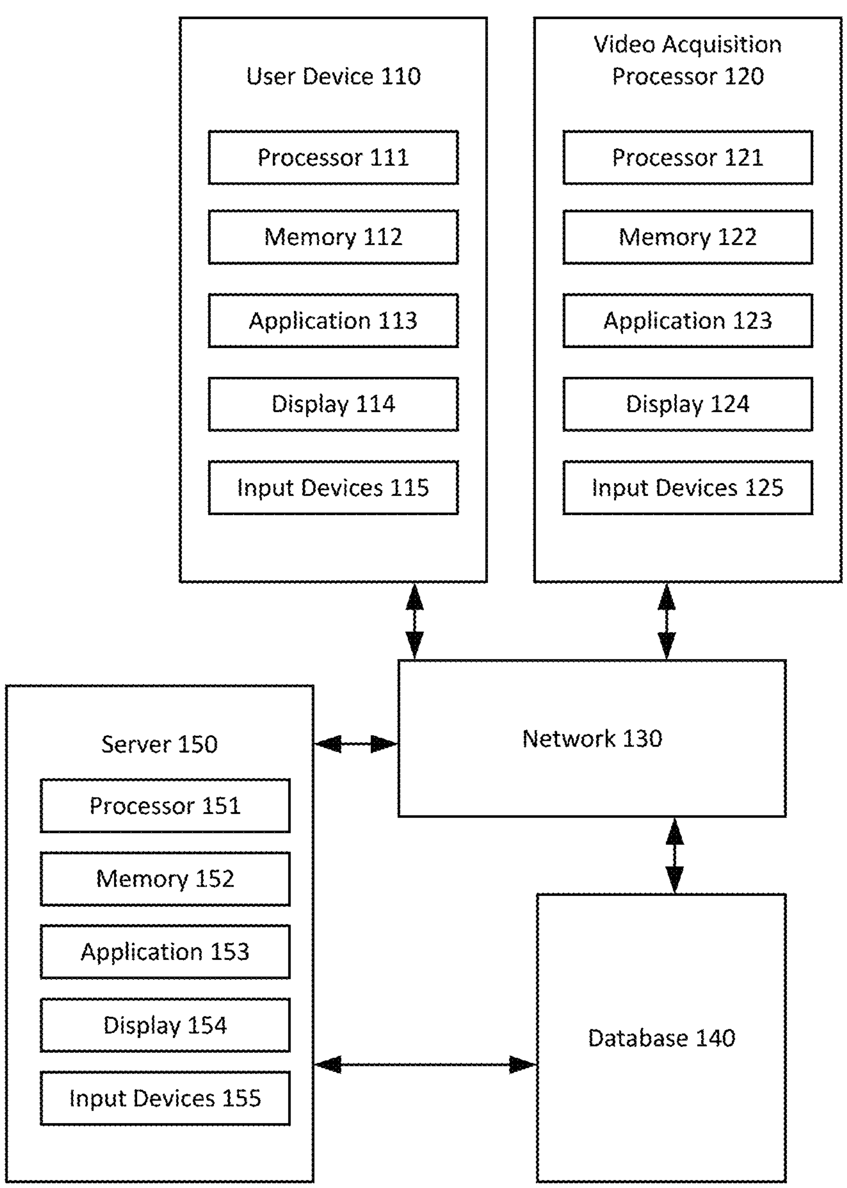
FIG. 1 is a block diagram illustrating a system according to an exemplary embodiment.

FIG. 1 is a block diagram illustrating a system according to an exemplary embodiment. The system 100 may comprise a user device 110, video acquisition processor 120, a network 130, a database 140, and a server 150.

The system 100 can include a user device 110. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The system 110 can include a video acquisition processor 120. The video acquisition processor 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or any other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Generally, the video acquisition device may be attached to a mobile unmanned underwater vehicle or some other fixed or unfixed video capturing device.

The video acquisition processor 120 may include a processor 121, a memory 122, and an application 123. The processor 121 may be a processor, a microprocessor, or other processor, and the video acquisition processor 120 may include one or more of these processors. The processor 121 may include processing circuitry, which may contain additional components, including additional processors, memories, error and parity/CRC checkers, data encoders, anticollision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the video acquisition processor 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications, such as a mobile application and a web browser, comprising instructions for execution on the video acquisition processor 120. In some examples, the video acquisition processor 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The video acquisition processor 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the video acquisition processor 120 that is available and supported by the video acquisition processor 120, such as a touch-screen, keyboard, mouse, cursor-control device, touch-screen, microphone, digital camera, video recorder or camcorder. These devices may be used to enter information and interact with the software and other devices described herein.

The system 100 can include a network 130. System 100 may include one or more networks 130. In some examples, the network 130 may be one or more of a wireless network, a wired network or any combination of wireless network and wired network, and may be configured to connect the user device 110, the server 150, and the database 140. For example, the network 130 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 130 may include, without limitation, telephone lines, fiber optics, IEEE Ethernet 902.3, a wide area network, a wireless personal area network, a LAN, or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks. The network 130 may further comprise, or be configured to create, one or more front channels, which may be publicly accessible and through which communications may be observable, and one or more secured back channels, which may not be publicly accessible and through which communications may not be observable.

System 100 may include a database 140. The database 140 may be one or more databases configured to store data, including without limitation, private data of users, financial accounts of users, identities of users, transactions of users, and certified and uncertified documents. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 150 or may be hosted externally of the server 140, such as by a server, by a cloud-based platform, or in any storage device that is in data communication with the server 150.

System 100 may include a server 150. The server 150 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 150 may include a processor 151, a memory 152, and an application 153. The processor 151 may be a processor, a microprocessor, or other processor, and the server 130 may include one or more of these processors. The processor 151 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 151 may be coupled to the memory 152. The memory 152 may be a read-only memory, write-once read-multiple memory or read/write memory, e.g., RAM, ROM, and EEPROM, and the server 150 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 152 may be configured to store one or more software applications, such as the application 153, and other data, such as user's private data and financial account information.

The application 153 may comprise one or more software applications comprising instructions for execution on the server 150. In some examples, the server 150 may execute one or more applications, such as software applications, that enable, for example, network communications with one or more components of the system 100, transmit and/or receive data, and perform the functions described herein. Upon execution by the processor 151, the application 153 may provide the functions described in this specification, specifically to execute and perform the steps and functions in the process flows described below. For example, the application 153 may be executed to perform receiving web form data from the user device 110 and masking private data received from the user device 110. Such processes may be implemented in software, such as software modules, for execution by computers or other machines. The application 153 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 150 may further include a display 154 and input devices 155. The display 154 may be any type of device for presenting visual information such as a computer monitor, a flat panel display, and a mobile device screen, including liquid crystal displays, light-emitting diode displays, plasma panels, and cathode ray tube displays. The input devices 153 may include any device for entering information into the server 150 that is available and supported by the server 150, such as a touch-screen, keyboard, mouse, cursor-control device, touch-screen, microphone, digital camera, video recorder or camcorder. These devices may be used to enter information and interact with the software and other devices described herein.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a non-transitory computer-accessible medium (e.g., RAM, ROM, hard drive, or other storage device). For example, a computer-accessible medium can be part of the memory of the user device 110, the server 150, the network 130, and the database 140 or other computer hardware arrangement.

In some examples, a computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
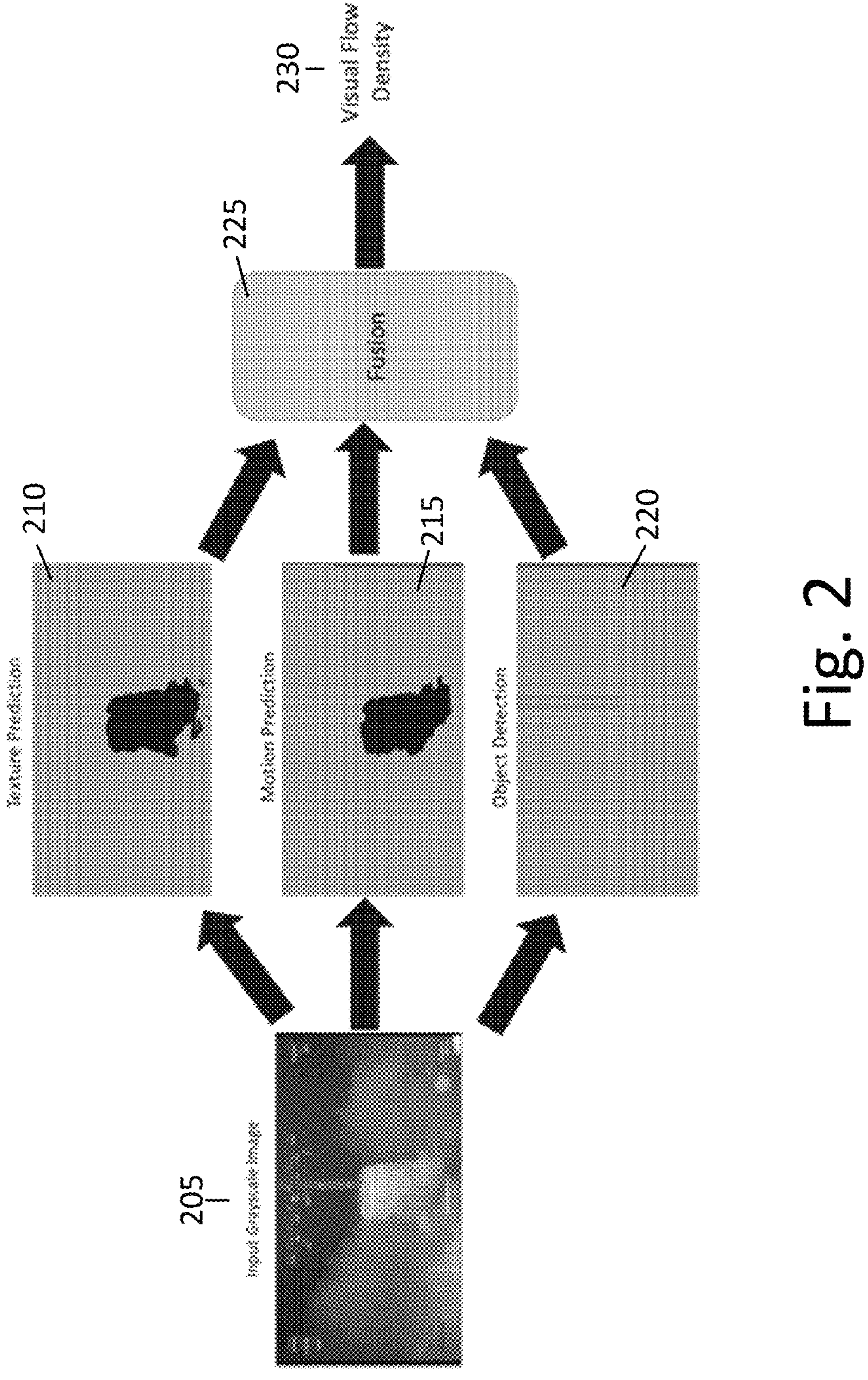
FIG. 2 is a block diagram illustrating a method according to an exemplary embodiment.

FIG. 2 is a diagram illustrating process for calculating a visual flow density from visual information. This process can be performed by a processor associated with the server, the user device, the video acquisition processor, or some other processor.

The process can begin with action 205 at which point the video acquisition processor captures visual information. The visual information can be a video or a series of images. The visual information may be that of an underwater bore hole and its surrounding applications. It is understood that other fluid flows may be captured by the video acquisition processor. The visual information may be combined with other information recorded by the video acquisition processor such as position, depth, temperature, and time. The video may be captured in greyscale or some other compatible color scale.

In actions 210, 215, and 220, a number of predetermined algorithms can interpret the video information captured by the video acquisition processor. The visual information can be transmitted over a network to the server, or the video acquisition processor may include the predetermined algorithms. Additionally, the user device can be provisioned with the predetermined algorithms. The predetermined algorithms can include a texture prediction algorithm, a fluid motion estimation algorithm, and an object detection algorithm. The texture prediction algorithm in action 210 can be provisioned or trained to identify image textures associated with outward fluid flow. The fluid motion estimation algorithm in action 215 can be provisioned or trained to compare the current image to earlier images in order to identify motion regardless of appearance. The fluid motion estimation algorithm may process each image individually or in combination. The objection detection algorithm in action 220 can be provisioned or trained to identity physical structures in the visual data. In an exemplary embodiment, the physical structures may be predetermined as a pipe and wellhead associated with the bore hole. It is understood that the object detection algorithm can be trained to identify other objects than those listed. Actions 210, 215, and 220 can be performed in any order.

In action 225, the fusion algorithm analyzes the current image textures, the fluid movement, and the one or more objects near the flowing fluids. The fusion algorithm can be provisioned or trained to analyze the findings of the texture prediction algorithm, the motion prediction algorithm, and the object detection algorithm. Upon analyzing the information, the fusion algorithm can calculate an estimate outward fluid flow or visual flow density. Next, the fusion algorithm can compare the estimated outward fluid flow with the one or more sets of historical normal flow data. The historical normal flow data can be retrieved by a processor from a database or data storage unit. Then, the fusion algorithm can determine whether the estimated outward fluid flow expresses a deviation from the historical normal flow data. This deviation can have a predetermined minimum. Having calculated the estimated outward flow, the fusion algorithm may transmit the estimated outward flow to a user device.

Figure 3:
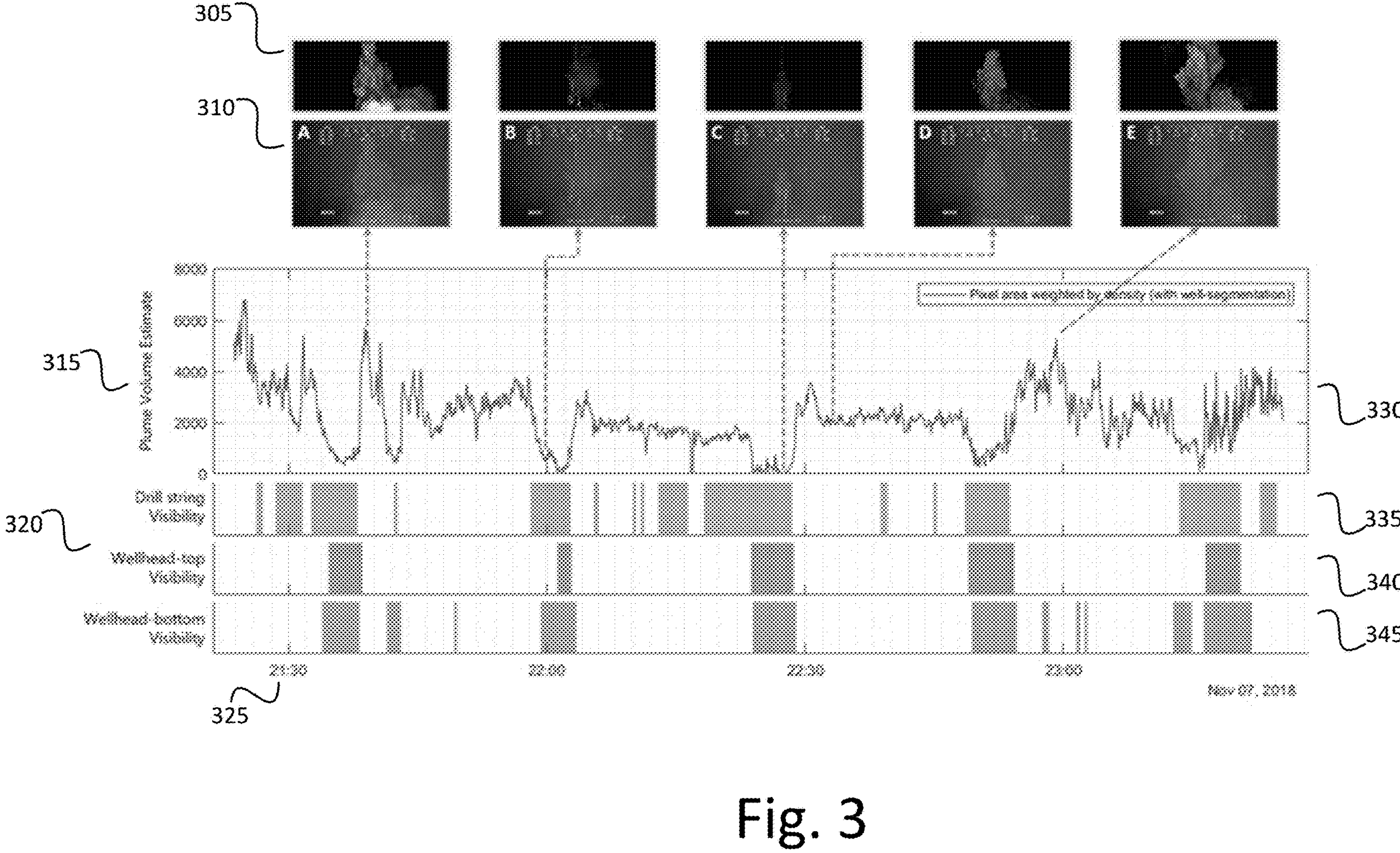
FIG. 3 is a diagram illustrating a predictive model according to an exemplary embodiment.

FIG. 3 illustrates a graph diagram according to an exemplary embodiment. The graph diagram represents a presentation and analysis of data gathered by the video acquisition processor including but not limited to visual data, time data, and positional data such as depth. The visual information can be related to a video or series of images 305 associated with an underwater bore hole and one or more plumes of fluid. The images can be analyzed in a predetermined color scale such as grayscale. The images may also comprise information on the video interface as shown in 310. This information can include visual information, time data, and positional data such as depth. The information displayed in 305 and 310 can be captured by the video acquisition processor and transmitted over a network to server. Upon receiving the information, the server can interpret the information to determine whether the visual density has significantly deviated. Significant deviations may indicate a problem with the wellbore.

The server may analyze the visual information as a function of plume volume 315 and time 325. The plume volume may be recorded based on the size and visibility of the plume as shown in the visual data. As time progresses, the plume size can experience variations in size due to a number of factors including but not limited to underwater current, temperature, and bore hole factors. These variations in size can be described in 330. In addition to plume size, the server can determine visibility of objects 320 associated with the borehole, including but not limited to drill string visibility, wellhead-top visibility, and wellhead-bottom visibility. These three visibility variables may change independently or in relation to each other as shown in 335, 340 and 345.

Figure 4:
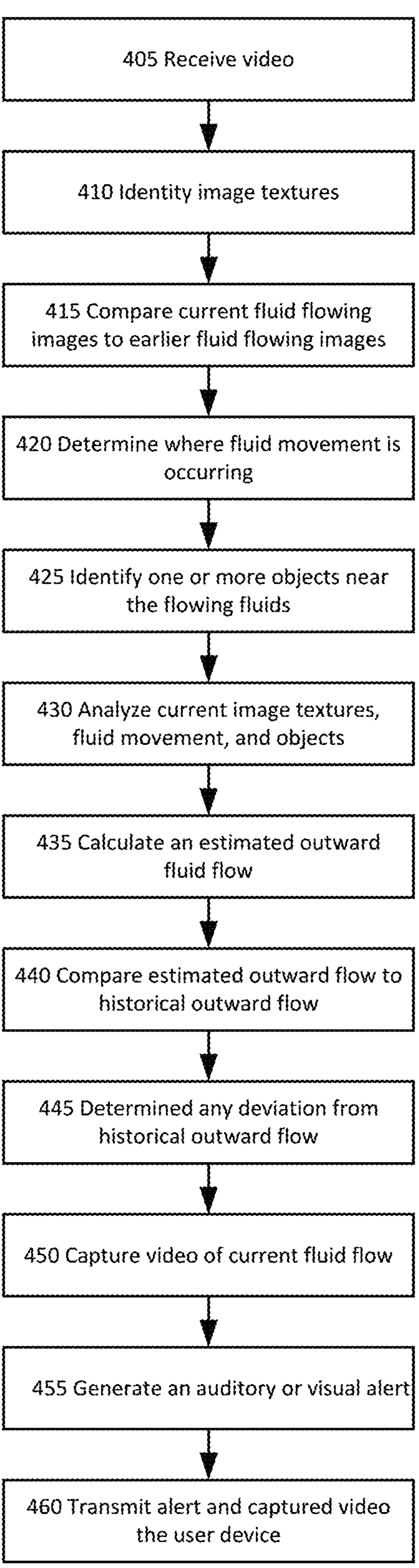
FIG. 4 is a flowchart illustrating a method according to an exemplary embodiment.

FIG. 4 is a flowchart illustrating a method according to an exemplary process. The method can include without limitation a user device, a video acquisition processor, a network, a database, and a server. The method relates generally to visual information associated with an underwater borehole, wellbore, and flowing fluids. Generally, environmentally safe fluids are used in boreholes to disperse debris from the bore site. A video can be taken of the bore site, in particular the plume of flowing fluids coming from the borehole. If there is a significant deviation in plume size or object visibility, then an alert can be generated and sent to the proper users.

In action 405, the server received visual data such as video or images from the video acquisition processor. The images and videos can be associated with flowing fluids at or near a borehole or wellhead. The visual data can be sent over a wired or wireless network. The server can include one or more predetermined algorithms including at least a texture prediction algorithm, a fluid motion algorithm, an object detection algorithm, and a fusion algorithm. In other embodiments, the server can also have a flow-in algorithm configured to analyze visual information associated with fluids flowing into an underwater cavity. The flow-in algorithm would also analyze the visual information captured by the video acquisition processor. In such an embodiment, the fusion algorithm would also analyze the flow-in algorithm into its fluid flow calculation.

In action 410, the texture prediction algorithm can identify image textures from the visual information captured by the video acquisition processor. The image textures can be determined based on the plumes and objects near the borehole and the wellhead. The textures can be distinguished into one or more categories by the algorithm. In action 415, the fluid motion estimation algorithm compares one or more current images of the flowing fluids to one or more earlier images of the flowing fluids. The earlier images of the flowing fluids may be retrieved from a database or data storage unit. Upon comparing the current images to the earlier images, the fluid motion estimation algorithm can determine where fluid movement is occurring. In action 420, the algorithm may determine where movement is occurring within the visual limitations of the video acquisition processor or the user device. In action 425, the object detection algorithm, identifies one or more objects near the flowing fluids. The objects can include without limitation a drill string, wellhead top, wellhead bottom, and the general shape of the fluid plume. In action 430, the fusion algorithm analyzes the current image textures, the fluid movement, and the identified objects. Upon analyzing this information, in action 435 the fusion algorithm can calculate an estimated outward fluid flow. This estimation is discussed with further reference to FIG. 3. In other embodiments, the server can receive new visual information from the video acquisition processor once the outward fluid flow is estimated. In such embodiments, the video acquisition processor can continuously feed new information into the algorithms. In action 440, the fusion algorithm compares the current estimated outward fluid flow with the historical outward flow. The historical outward flow may be retrieved from a database or data storage unit. Upon comparing the two outward flows, in action 445 the fusion algorithm can determine whether there is any deviation between the current outward flow and the historical outward flow. If a deviation is found, in action 450 a video of the current fluid flow may be captured or recorded. This action can be performed by the video acquisition processor. The video may include some predetermined length of video or images including the wellhead and fluid plume. In action 455, an alert associated with the deviated fluid flow is generated. This action can be performed by processor associated with the server or the video acquisition processor. Finally, in action 460, the alert and video are transmitted to the user device where the user can proceed.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

We claim:

1. A system for measuring underwater fluid flow with full motion video, the system comprising:
- a user device;
- a video acquisition processor;
- a data storage unit configured to store at least one or more sets of historical normal flow data; and
- a server comprising at least one computer processor, the server configured to:
  - receive, over a network, one or more images or videos from the video acquisition processor, the images or videos comprising visual information associated with one or more flowing fluids;
  - identify, one or more current image textures associated with the flowing fluids from the one or more images or videos;
  - compare, the one or more current images of the flowing fluids to one or more earlier images of the flowing fluids;
  - determine, upon comparing the current images to the earlier images, where fluid movement is occurring;
  - identify, one or more objects near the flowing fluids;
  - analyze, by the fusion algorithm, the current image textures, the fluid movement, the one or more objects near the flowing fluids, and visual information associated with fluids flowing into an underwater cavity as a function of plume volume and time;
  - calculate, upon analyzing the current image textures, the fluid movement, and the one or more objects near the flowing fluids, an estimated outward fluid flow;
  - compare, the estimated outward fluid flow with the one or more sets of historical normal flow data;
  - determine, whether the estimated outward fluid flow expresses a deviation from the historical normal flow data;
  - capture, upon determining that the estimated outward fluid flow expresses a deviation from the historical normal flow data, a visual image or video of the current fluid flow;
  - generate an auditory or visual alert;
  - transmit the visual image or video of the current fluid flow and the auditory or visual alert to the user device;
  - receive, over the network, updated one or more images or videos from the video acquisition processor upon calculation of the estimated outward fluid flow; and
  - recalculate the estimated outward fluid flow based on the updated one or more images or videos.

2. The system of claim 1, wherein the fluid flow is associated with an underwater wellbore.

3. The system of claim 1, wherein the one or more objects near the flowing fluids comprise at least one of a drill string, a wellhead top, a wellhead bottom, or a pipe.

4. The system of claim 1, wherein the server is further configured to compare current and past images of flowing fluids to the one or more objects near the flowing fluids.

5. A method for measuring underwater fluid flow with full motion video, the method comprising:
- receiving, over a network, one or more images or videos from a video acquisition processor, images or videos comprising visual information associated with one or more flowing fluids;
- identifying, by one or more computer processors, one or more current image textures associated with the flowing fluids from the one or more images or videos;
- comparing, by the one or more computer processors, the one or more current images of the flowing fluids to one or more earlier images of the flowing fluids;
- determining, upon comparing the current images to the earlier images, where fluid movement is occurring;
- identifying, by the one or more computer processors, one or more objects near the flowing fluids;
- analyzing, by the one or more computer processors, the current image textures, the fluid movement, the one or more objects near the flowing fluids, and visual information associated with fluids flowing into an underwater cavity as a function of plume volume and time;
- calculating, by the one or more computer processors upon analyzing the current image textures, the fluid movement, and the one or more objects near the flowing fluids, an estimated outward fluid flow;
- compare, by the one or more computer processors, the estimated outward fluid flow with the one or more sets of historical normal flow data;
- determining, by the one or more computer processors, whether the estimated outward fluid flow expresses a deviation from the historical normal flow data;
- capturing, by the one or more computer processors upon determining that the estimated outward fluid flow expresses a deviation from the historical normal flow data, a visual image or video of the current fluid flow;
- generating an auditory or visual alert;
- transmitting, by the one or more computer processors, the visual image or video of the current fluid flow and the auditory or visual alert to a user device;
- receiving, over the network, updated one or more images or videos from the video acquisition processor upon calculation of the estimated outward fluid flow; and
- recalculating, by the one or more computer processors, the estimated outward fluid flow based on the updated one or more images or videos.

6. The method of claim 5, wherein the fluid flow is associated with an underwater wellbore.

7. The method of claim 5, wherein the one or more objects near the flowing fluids comprise at least one of a drill string, a wellhead top, a wellhead bottom, or a pipe.

8. The method of claim 5, further comprising: comparing, by the one or more computer processors, current and past images of flowing fluids to the one or more objects near the flowing fluids.

9. A computer readable non-transitory medium comprising computer executable instructions that, when executed on a computer processor, cause the computer processor to perform steps comprising:
- receiving, over a network, one or more images or videos from a video acquisition processor, images or videos comprising visual information associated with one or more flowing fluids;

identifying one or more current image textures associated with the flowing fluids from the one or more images or videos;

comparing, the one or more current images of the flowing fluids to one or more earlier images of the flowing fluids;

determining, upon comparing the current images to the earlier images, where fluid movement is occurring;

identifying one or more objects near the flowing fluids;

analyzing the current image textures, the fluid movement, the one or more objects near the flowing fluids, and visual information associated with fluids flowing into an underwater cavity as a function of plume volume and time;

calculating, upon analyzing the current image textures, the fluid movement, and the one or more objects near the flowing fluids, an estimated outward fluid flow;

comparing, the estimated outward fluid flow with the one or more sets of historical normal flow data;

determining, whether the estimated outward fluid flow expresses any deviations from the historical normal flow data;

capturing, upon determining that the estimated outward fluid flow expresses a deviation from the historical normal flow data, a visual image or video of the current fluid flow;

generating an auditory or visual alert; and transmitting the visual image or video of the current fluid flow and the auditory or visual alert to a user device;

receiving, over the network, updated one or more images or videos from the video acquisition processor upon calculation of the estimated outward fluid flow; and recalculating the estimated outward fluid flow based on the updated one or more images or videos.

10. The computer readable non-transitory medium of claim 9, wherein the fluid flow is associated with an underwater wellbore.

11. The computer readable non-transitory medium of claim 9, further configured to perform steps comprising; comparing current and past images of flowing fluids to the one or more objects near the flowing fluids.

* * * * *